US009411621B2

(12) United States Patent
Jeswani et al.

(10) Patent No.: US 9,411,621 B2
(45) Date of Patent: Aug. 9, 2016

(54) GROUPING AND AUTOMATICALLY PROPAGATING UPDATES TO EQUIVALENT ONLINE AND OFFLINE VIRTUAL MACHINES IN A DATA CENTER

(71) Applicant: International Business Machines Corporation, Armonk, NY (US)

(72) Inventors: Deepak Jeswani, New Delhi (IN); Akshat Verma, New Delhi (IN); Praveen Jayachandran, Bangalore (IN); Kamal Bhattacharya, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 13/748,909

(22) Filed: Jan. 24, 2013

(65) Prior Publication Data

US 2014/0208314 A1     Jul. 24, 2014

(51) Int. Cl.
 G06F 9/455     (2006.01)
 G06F 9/445     (2006.01)

(52) U.S. Cl.
 CPC .............. G06F 9/45533 (2013.01); G06F 8/65 (2013.01)

(58) Field of Classification Search
 None
 See application file for complete search history.

(56) References Cited

U.S. PATENT DOCUMENTS

| 7,849,156 | B2 | 12/2010 | Alpern et al. | |
| 8,219,592 | B2 | 7/2012 | Alpern et al. | |
| 8,352,930 | B1* | 1/2013 | Sebes et al. | 717/168 |
| 2003/0221190 | A1* | 11/2003 | Deshpande et al. | 717/171 |
| 2009/0100420 | A1 | 4/2009 | Sapuntzakis et al. | |
| 2009/0300607 | A1 | 12/2009 | Ferris et al. | |
| 2010/0257523 | A1* | 10/2010 | Frank | G06F 9/45558 718/1 |
| 2011/0225574 | A1 | 9/2011 | Khalidi et al. | |
| 2011/0265076 | A1* | 10/2011 | Thorat et al. | 717/172 |
| 2012/0005676 | A1 | 1/2012 | Nakajima | |
| 2013/0007733 | A1* | 1/2013 | Fries et al. | 718/1 |
| 2014/0033188 | A1* | 1/2014 | Beavers et al. | 717/170 |

OTHER PUBLICATIONS

SHA-1. Wikipedia. http://en.wikipedia.org/wiki/SHA-1 downloaded Jan. 4, 2013, pp. 1-12.
System for Detecting and Installing Software Updates to a Cloud Instance, IP.com Disclosure No. IPCOM000208883D, Publication Date: Jul. 21, 2011.

(Continued)

*Primary Examiner* — Abdullah Al Kawsar
*Assistant Examiner* — Michael Ayers
(74) *Attorney, Agent, or Firm* — Ryan, Mason & Lewis, LLP (57) ABSTRACT

Techniques, systems, and articles of manufacture for automatically propagating updates in a data center. A method includes dividing multiple virtual machines in a data center into one or more equivalence classes, wherein each equivalence class is based on a signature corresponding to an offline, online and/or manual update, automatically creating an offline and/or online virtual machine manifest for a first virtual machine of the multiple virtual machines based on one or more file system changes during the offline, online and/or manual update for the first virtual machine, wherein said manifest is applicable to each additional virtual machine in the same equivalence class as the first virtual machine, and applying the offline and/or online virtual machine manifest for the first virtual machine to the remaining multiple virtual machines in the same equivalence class to automatically update the remaining multiple virtual machines in the same equivalence class.

11 Claims, 6 Drawing Sheets

(56) References Cited

OTHER PUBLICATIONS

Ammons et al., Virtual Machine Images as Structured Data: the Mirage Image Library. In Proc. HotCloud, 2011, pp. 1-6.
Ayachitula et al., IT Service Management Automation—A Hybrid Methodology to Integrate and Orchestrate Collaborative Human Centric and Automation Centric Workflows. In IEEE SCC, 2007.
Balani et al., Povminer: Application-Agnostic Configuration Mining, SOCC'12 USA, pp. 1-13.
Crameri et al., Staged Deployment in Mirage, an Integrated Software Upgrade Testing and Distribution System. In SOSP, 2007, pp. 1-16.
Huang et al., Patch Management Automation for Enterprise Cloud. In Proc. of NOMS, pp. 691-705, 2012.
IBM. Tivoli Endpoint Manager, Online, http://www-01.ibm.com/software/tivoli/solutions/endpoint downloaded Jan. 23, 2013, pp. 1.
VMware Inc. vCenter Configuration Manager. Online, http://www.vmware.com/products/configuration-manager/overview.html downloaded Jan. 24, 2013, pp. 1.
VMware Inc. vSphere Update Manager. Online, http://www.vmware.com/products/datacenter-virtualization/vsphere/update-manager.html downloaded Jan. 24, 2013, pp. 1-2.
Kotsovinos, Virtualization: Blessing or Curse? In Communications of the ACM, 2011, pp. 1-7.
Kranenburg et al., Debugging Utility for Linux. http://linux.die.net/man/1/strace downloaded Jan. 24, 2013, pp. 1-5.
Lowell et al., Devirtualizable Virtual Machines Enabling General, Single-Node, Online Maintenance. In Proc. of ASPLOS, pp. 211-223, 2004.
Magoutis et al., Galapagos: Automatically Discovering Application-Data Relationships in Networked Systems. In Proc. of IEEE IM, 2007.
Microsoft Corporation. Virtual Machine Servicing Tool 3.0 Online. http://technet.microsoft.com/en-us/library/cc501231.aspx. Dec. 8, 2008, pp. 1-3.
Microsoft Corporation. Windows Server Update Services. Online, http://technet.microsoft.com/en-us/windowsserver/bb332157.aspx downloaded Jan. 24, 2013, pp. 1.
Oracle Corporation. Realizing the Economic Benefits of Oracle Enterprise Manager Ops Center (White Paper), Apr. 2012, pp. 1-16.
Potter et al., Reducing Downtime Due to System Maintenance and Upgrades, in Proc. of Large Installation System Administration Conference, 2005, pp. 47-62.
Su et al., Automatically Generating Predicates and Solutions for Conguration Troubleshooting. In Proc. of Usenix Technical Conference, 2009, pp. 1-13.
Viswanathan et al., Rapid Adjustment and Adoption to Miaas Clouds. In Proc. of Middleware, Industry track (to appear), Dec. 2012, pp. 1-6.
VMware Inc. (formerly Shavlik). VMware vCenter Protect. Online, http://www.vmware.com/products/datacenter-virtualization/vcenter-protect/overview.html downloaded Jan. 24, 2013, pp. 1-4.
Zhou et al., Always Up-to-Date—Scalable Offline Patching of VM Images in a Compute Cloud. In ACSAC, 2010, pp. 1-10.

\* cited by examiner

```
Input: Set S, Update U_i
While S is not empty
    Phase 1: Select a target instance I_j at random
    Apply the update U_i on I_j
    Create the Signature S_{i,j} and manifest M_{i,j}
    Update S_{i,j} and M_{i,j} using cross-dffierence
    Phase 2 (Parallel): Compute S_{i,k} for all images I_k
        and create equivalent classes
    For all I_k ≡_{U_i} I_j , (Parallel Step)
        If U_i was successful on I_j
            Apply M_{i,j} or U_i on I_k
        Else
            Mark I_k as failed
        End-If
        Remove I_k from S
    End-For
End-While
```

GROUPING AND AUTOMATICALLY PROPAGATING UPDATES TO EQUIVALENT ONLINE AND OFFLINE VIRTUAL MACHINES IN A DATA CENTER

FIELD OF THE INVENTION

Embodiments of the invention generally relate to information technology, and, more particularly, to data center management.

BACKGROUND

Virtualization has facilitated the creation of new virtual machine (VM) instances. As such, instances arise where there can exist a proliferation of barely-used VMs, as developers may forget to return (or intentionally postpone, anticipating reuse) unused VMs to a resource pool at the end of a project. However, existing system management technologies are generally unable to keep pace with this rapid proliferation, and the management cost of keeping all virtual machine images updated, both dormant and active, is significant.

While existing approaches for applying patches for online virtual machines address some scalability challenges, the patches themselves remain unreliable, and administrators in such approaches are required to manually fix failed updates. Additionally, once a failed update is fixed, the administrator must ensure that the patch itself is fixed or create yet another patch that can be fed to the tools for automatic application on the VMs. Accordingly, such tools do not help to significantly reduce the total application downtime, as a substantial amount of the downtime is needed to manually fix problems during the update process. Further, such tools do not patch dormant VM images. Consequently, a need exists to automatically and reliably propagate updates in a data center.

SUMMARY

In one aspect of the present invention, techniques for automatically propagating updates in a data center are provided. An exemplary computer-implemented method can include steps of dividing multiple virtual machines in a data center into one or more equivalence classes, wherein each equivalence class is based on a signature corresponding to an offline, online and/or manual update, automatically creating an offline and/or online virtual machine manifest for a first virtual machine of the multiple virtual machines based on one or more file system changes during the offline, online and/or manual update for the first virtual machine, wherein said manifest is applicable to each additional virtual machine in the same equivalence class as the first virtual machine, and applying the offline and/or online virtual machine manifest for the first virtual machine to the remaining multiple virtual machines in the same equivalence class to automatically update the remaining multiple virtual machines in the same equivalence class.

In another aspect of the invention, an exemplary computer-implemented method can include steps of identifying an offline, online and/or manual update and a first virtual machine image on which to apply the offline, online and/or manual update from a data center administrator, obtaining a snapshot of the first virtual machine image, and invoking the data center administrator to perform the offline, online and/or manual update on the first virtual machine image. The method also includes obtaining a signature from the data center administrator, wherein said signature is associated with the performed offline, online and/or manual update, leveraging the snapshot of the first virtual machine image to create a manifest for the performed update, and using the signature to generate a corresponding equivalence class, wherein the equivalence class includes the first virtual machine image and one or more additional virtual machine images on which the performed offline, online and/or manual update can be applied.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes automatically propagating rapid and reliable updates in virtual machines farms and/or data centers. Such updates can include, for example, patches, software installations, and compliance checks. At least one embodiment of the invention includes analyzing all target images and creating reliable image patches using a limited number of online updates. Additionally, the techniques detailed herein can be implemented for both active and dormant instances as well as with multiple types of updates (for example, without source code), and can also scale with new types of updates.

Traditionally, updates are applied by taking the application offline, applying updates, and restoring the application; as noted above, such a process is unreliable and has an unpredictable downtime. At least one embodiment of the invention includes a two phase process. In the first phase, images are analyzed to create an update signature and update manifest. In the second phase, downtime is taken and the manifest is applied offline on virtual images in a parallel, reliable and automated manner. Accordingly, such techniques can apply updates to already dormant VMs, and all updates following this process work reliably, leading to reduced and predictable downtimes.

As further described herein, at least one embodiment of the invention includes the use of a per-update profiling mechanism to divide VMs into equivalence classes. Also, a background logging mechanism is used to convert updates on live instances into patches for dormant images. Further, a cross-difference mechanism can be used to filter system-specific and/or random information (for example, host name, and internet protocol (IP) address), while creating equivalence classes. Instances that belong to a common equivalent class will perform identically for the specified update. This reliability enables performance of updates in a fully automated manner as well as in parallel on all equivalent instances, leading to significant reductions in update time and labor cost. Further, such techniques avoid expensive operating system and application testing after update applications, leading to shorter change windows.

As used herein, a cloud instance refers to a running virtual machine managed by a cloud. Also, a cloud image refers to a representation of the filesystem hosting the virtual machine at a given point in time (also referred to as snapshot). Further, as used herein, an online update refers to a software change applied on a cloud instance. Online updates can include, by way of example, applying security patches, migration-related adjustments, and software upgrades. Additionally, as used herein, an offline update refers to a set of changes applied on a cloud image. An offline update is designed to replicate the impact of an online update.

As noted above, a standard existing update process on production servers begins with a request for a change window to perform the change. Once the change window is granted, the application is shut down at the start of the window, and the update is then applied on the target server. Once the update completes, testing is performed to ensure that the update did not break the application. Testing includes operating system health checks followed by health checks for the application. If testing succeeds, the change window is closed; otherwise, manual remediation is performed followed by re-testing.

At least one embodiment of the invention, as described herein, includes implementation with system updates, which are common across a data center. Examples of such updates can include security patches, compliance updates, installation and configuration of system management software, upgrades of operating systems and common middleware. A common denominator for such updates is that each is applied on a large number of systems. Accordingly, an aspect of the invention includes profiling such updates on very few instances and using that information to update a majority of the instances in a reliable and low-cost manner.

Further, in at least one embodiment of the invention, VM sprawl can also be leveraged to increase the inherent reliability of system updates. The ease of cloning instances and the use of golden masters to provision instances in a virtualized data center can lead to a large number of virtual machines with the same system and middleware footprint (with possibly different applications and data). Given an update, an aspect of the invention includes automatically profiling the update and identifying all instances that are semantically equivalent for the update. Equivalent instances respond identically to an update, allowing updates to be applied reliably, automatically, and rapidly.

Figure 1:
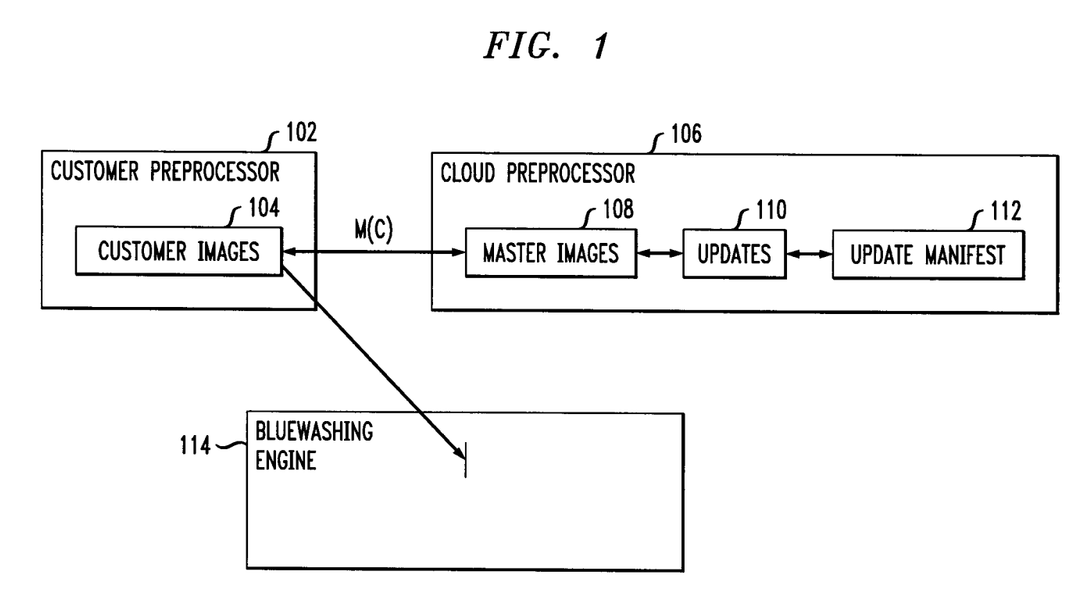
FIG. 1 is a diagram illustrating an example architectural flow, according to an embodiment of the present invention.

FIG. 1 is a diagram illustrating an example architectural flow, according to an embodiment of the present invention. By way of illustration, FIG. 1 depicts a customer pre-processor 102 which includes customer images 104, and a cloud pre-processor 106 which includes master images 108, updates 110 and an update manifest 112. Additionally, FIG. 1 depicts a bluewashing engine (also referred to herein as an adjustment engine) 114.

As used herein, a customer image (C) (such as from customer images 104) is a snapshot of a VM instance running in the customer environment, and a master image (M) (such as from master images 108) is an image supported by a cloud stack. A master image contains all of the required management software and updates, and meets all relevant guidelines. Additionally, an update (U) (such as from updates 110) is used to denote any script or application that needs to be applied to a customer image to make the customer image compliant with the cloud stack.

In accordance with at least one embodiment of the invention, a process flow such as depicted in FIG. 1 can include the following. In the cloud pre-processor 106, for each master image M (from master images 108) and update (or adjustment) U (from updates 110), at least one embodiment of the invention includes creating an update signature (which includes all files impacted by the update/adjustment) and an image or update manifest 112. An update signature contains only the list of files that were impacted, while an update manifest (or image manifest) 112 is a collection of files. One file in this collection can include a meta file which contains information of which operations (create, write, append, etc.) were performed on which file (of the update signature). The meta file can also contain a pointer to a file (that is, one of the files of the update manifest 112 collection) which contains the data to make the file the same as the file in the relevant image.

Additionally, in the customer pre-processor 102, for each customer image C (from customer images 104), at least one embodiment of the invention includes determining its closest master M(C), which is found on the basis of the installed operating system and software. Also, a difference signature Diff(C, M) is created between each image C and its chosen master M. The difference signature is the list of files that are different in image C and its corresponding master image M(c). The difference signature is computed to determine which images come under one equivalence class, and it is computed via use of the content of the file and the computing digest (for example, the SHA1 digest) of the file.

Further, in the bluewashing/adjustment engine 114, if a Diff(C,M) and update signature are disjointed, at least one embodiment of the invention includes applying corresponding image adjustment. As noted above, the update signature and difference signature are lists of files. The update signature is a list of files that was impacted, whereas the difference signature contains files that are different in master and customer. By iterating over file names, at least one embodiment of the invention can determine whether the two sets are disjointed or not.

The remaining images are divided into equivalence classes, wherein all images with identical content in the update signature belong to one (that is, the same) class. Also, an online adjustment is applied in each equivalence class to create the manifest customized for the class, and image adjustments are applied using these manifests.

As described herein, an aspect of the invention includes per-update equivalence class identification. At least one embodiment of the invention includes creating a signature for each update and partitioning all relevant instances (online and offline) in a data center into equivalence classes based on the signature. A signature includes all files which may have a dependency on the update. As noted herein, a successful update on one member of an equivalence class guarantees successful update on other members, ensuring that the update process is reliable.

Additionally, another aspect of the invention includes cross-difference signature filtering. Signature files may typically contain environmental parameters (for example, internet protocol (IP) addresses and timestamps), leading to semantically identical images being classified as not equivalent. Accordingly, at least one embodiment of the invention includes employing a cross-difference signature filter to eliminate environmental or random noise from signature files, allowing for creation of larger equivalence classes.

Yet another aspect of the invention includes offline manifest creation. At least one embodiment of the invention includes logging all file system changes during an update to create an offline manifest that can be applied to other equivalent images with deterministic update durations. Further, the offline manifest can be created in a content-oblivious manner, that is, a manner oblivious to the actual actions performed by the update or any human remediation actions performed for the update to work. An offline manifest also enables the ability of handling dormant instances.

Another aspect of the invention, as detailed herein, includes implementing parallel automated offline updates. Once offline manifests are created, the reliability and content-oblivious nature of manifests enables automatically updating of multiple systems in parallel, leading to significant reduction in update time.

Accordingly, in identifying a set of VM images that are equivalent, at least one embodiment of the invention can include the following. A pair of images can be considered as equivalent if the result of any update applied on the two images would be identical. For a particular update, there may be many images which are equivalent to each other with respect to that update. By way of illustration, consider the following notations used herein to formalize the notion of equivalence.

Signature: A signature $S_{i,j}$ for an update $U_i$ and an image $I_j$ is defined as the set of all image files that impact the application of $U_i$ on image $I_j$. This also includes the list of all files which are read by the update $U_i$, along with their attributes.

Manifest: A manifest $M_{i,j}$ for an Update $U_i$ and an instance $I_j$ is defined as all files and properties that are modified or created by the update $U_i$ on image $I_j$. A manifest captures all filesystem changes, and applying the manifest $M_{i,j}$ offline is equivalent to applying the update $U_i$ on instance $I_j$.

Equivalent Images: Two instances $I_j$ and $I_k$ are said to be equivalent for a given update $U_i$, that is, $I_j \equiv_{U_i} I_k$, iff their manifests are identical: $M_{i,j} = M_{i,k}$.

As such, if an update is applied successfully on an instance $I_j$, the update will also be successful on any instances that are equivalent to $I_j$ for the given update. Consider also an example where an update $U_i$ was not automatically successful on an instance, but a system administrator performed additional operations on the instance to make the update successful. Consider a new update $U'_i$, which includes the update $U_i$ as well as the additional manual remediation actions performed to make the update successful. Any instances that are equivalent to $I_j$ for this modified update $U'_i$ can also be successfully updated by applying the update $U_i$ along with the manual actions performed in $U'_i$.

Given a set S of instances on which an update $U_i$ needs to be applied, at least one embodiment of the invention needs only to identify the distinct equivalence classes for $U_i$ in S. Then, if the update is successful for any one image in an equivalence class, the update will be successful on all other images in that class. Further, if an update failed on one image in an equivalence class, it can be reliably identified that the update will fail on all other images in that class without having to apply the update on any additional images.

To identify equivalence classes for an update $U_i$, at least one embodiment of the invention includes using the files that constitute the signature of the update. Given a successful update of $U_i$ on an instance $I_j$, the files in the update's signature $S_{i,j}$ are identified. All images that have an identical content in the signature files are marked as equivalent.

Additionally, it is noted that while images with identical signature are equivalent, images with different signatures can also have the same manifest and may be equivalent.

As also noted above, an aspect of the invention includes implementation of a cross-difference mechanism. It is noted that often files in a signature are configuration files for an operating system (OS), OS components, or application packages. Updates often seek the presence or configuration of various components or applications upon which they depend, and access the configuration files associated with these applications. Configuration files often contain environmental parameters or Points of Variability (PoV) such as, for example, IP addresses and hostnames. Such PoVs can differ across instances, and, as a result, even if a configuration file in two different instances is semantically equivalent, a simple diff between the two files may show differences. Accordingly, two such images would not be able to be classified as equivalent (even if they indeed are equivalent for an update).

Additionally, many applications often use extensible markup language (XML) files for configuration and tag XML nodes with randomly generated numbers. Such random numbers show up as differences between two files, which are identical in all other respects. Because at least one embodiment of the invention is designed to be content-oblivious (that is, does not use expert knowledge pertaining to the actual actions performed by updates), discarding the PoVs or random attributes while classifying files can be challenging.

Accordingly, at least one embodiment of the invention includes using clones of one instance to create the signature and manifest. Because the two instances are clones, their signature and manifest should be identical with respect to any noise or environment parameters. Any difference in content between the signatures of the two instances is annotated as noise. This cross-difference information is sent to a file difference method, which ignores any differences at locations annotated as noise between two files. Such a cross-difference mechanism increases the number of images in an equivalent class and thereby decreases the number of equivalence classes identified.

Also, at least one embodiment of the invention includes applying updates offline on a dormant VM instead of a running instance. This enables updating dormant VMs without a need to bring such VMs online. Dormant VMs often do not have compute or memory resources assigned and bringing such VMs online for updating is not feasible. Further, dormant images often lie in backup application instances or in libraries, which are brought up only when the primary application instance has failed. In such cases, updating the dormant instances may delay recovery, leading to extensive downtimes. Offline updates can lead to faster updating in many cases, and moreover, a large number of images can be updated in parallel in an offline fashion.

An offline update to an image includes applying the update manifest on equivalent images. Note that a manifest created using one instance cannot be applied on another instance unless the two instances are equivalent. As described herein, the manifest is created on an online instance for each equivalence class. Before the update is applied, a snapshot is taken of the instance. Once the update completes successfully, an image diff is performed between the snapshot and the updated instance. For every file that is different, a patch is created to transform the file in the snapshot to the file in the updated instance. The collection of these patches constitutes the manifest for the update, which can subsequently be used to update the remaining instances in the equivalence class offline.

Figure 2:
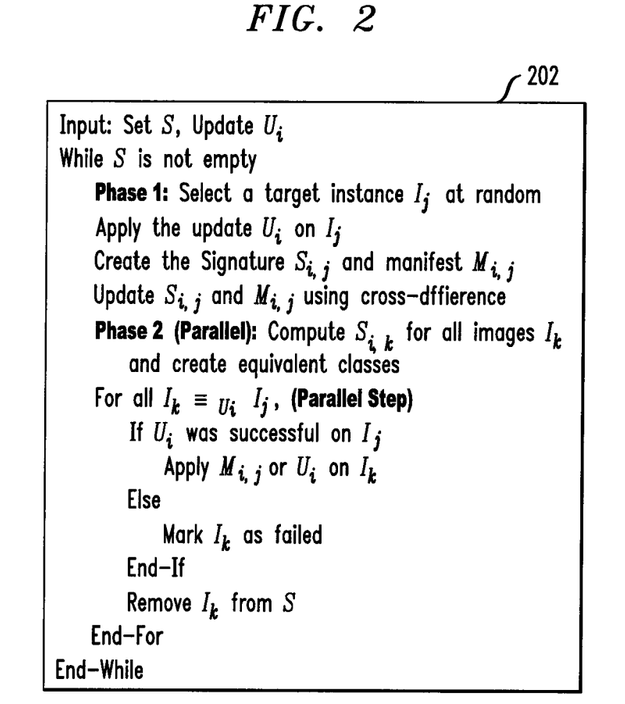
FIG. 2 is a diagram illustrating an automated system update process, according to an embodiment of the invention.

FIG. 2 is a diagram illustrating an automated system update process 202, according to an embodiment of the invention. Given a new update Ui that needs to be applied on a target set of instances S, the two-phase iterative process described in FIG. 2 can be implemented as follows.

The update process takes an update along with possible target instances S as input, and first finds a leader in the set S. On the leader, a regular update process is applied, which involves taking a conservative downtime. The leader can be elected randomly or can be elected based on some criterion. For example, the leader might be an instance that is not running any critical application. In any case, a signature of the final update is created, which is then used to identify one or more equivalence classes. All instances that are equivalent to the leader are either marked as failed (in case the original update had failed) or updated reliably (the update may either be applied offline using the manifest or online using the original update).

The actual update can be applied online or offline. If the update is applied using the offline manifest, all relevant images are updated in parallel. The following example rules can be used for selecting between an online and an offline mechanism for applying an update to an equivalence class. For dormant instances, the offline manifest is likely to be the preferred mechanism. If the update required human intervention on the leader, the offline manifest is again likely the preferred mechanism, because the offline manifest captures both automated and manual actions and can be replicated on the remaining VMs in the equivalence class without any human intervention.

For error-free updates on active instances, the choice between offline and online may depend on the duration of the online update and the number of equivalent images in the class. If the online update took a long time and/or required reboots, the offline manifest may speed up the process deterministically. If the online update was quick and/or applicable to only a few images, one may opt to apply the update online. The entire process can be optimized further by pipe-lining manifest creation and update application across multiple equivalent classes. That is, the process can be further parallelized by creating a manifest of all equivalence classes simultaneously and applying an offline update, thereby pipelining the entire process.

Figure 3:
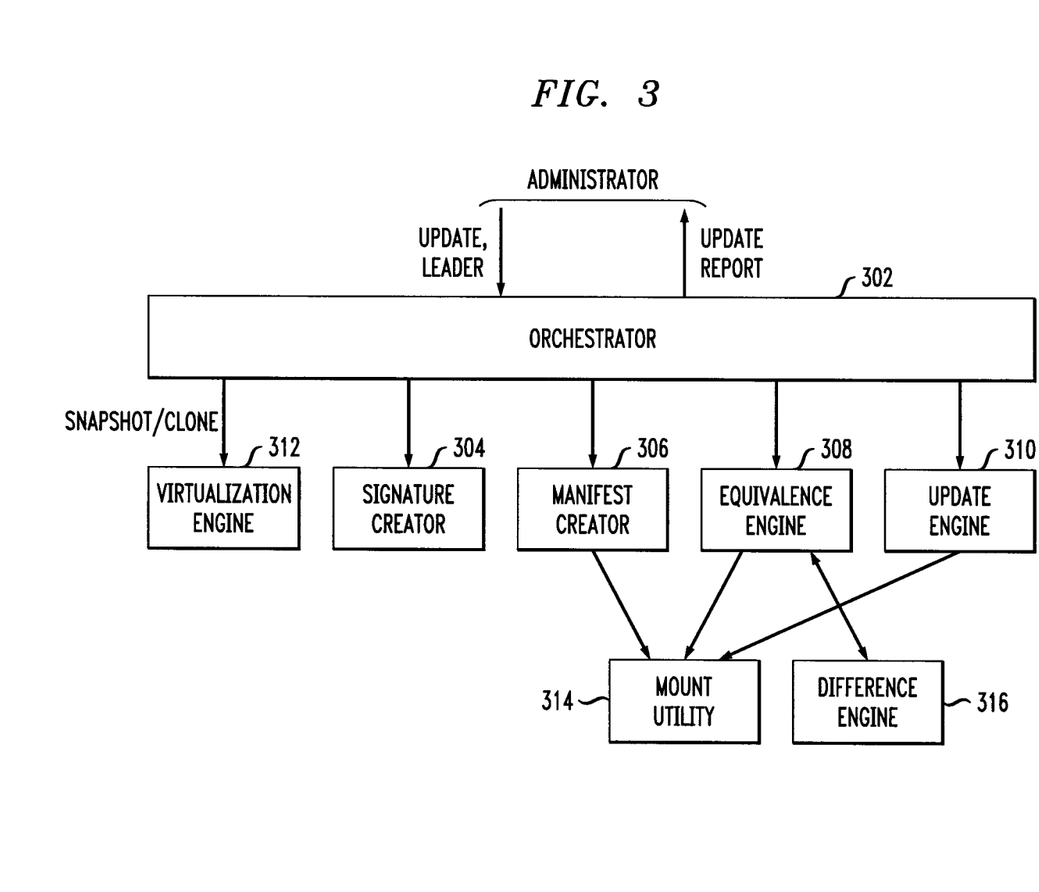
FIG. 3 is a diagram illustrating system components, according to an embodiment of the invention.

FIG. 3 is a diagram illustrating system components, according to an embodiment of the invention. An orchestrator component 302 drives the overall update process. For example, the orchestrator component 302 takes, from an administrator, an Update and a Leader VM image to apply the update. The orchestrator component 302 invokes a virtualization engine 312 to take a snapshot and asks the administrator to perform the update using a signature creator module 304. Once the update is completed, the signature creator module 304 returns the signature $S_{i,j}$ associated with the update $U_i$ on instance $I_j$. The orchestrator component 302 then invokes the manifest creator module 306, which leverages the snapshot to create a Manifest for the update. The orchestrator component 302 passes the signature of the update to the equivalence engine 308. The equivalence engine 308 leverages a file with difference engine 316, which implements the cross-difference mechanism, and returns the equivalence classes formed.

Each of the equivalence engine 308, update engine 310 and the manifest creator module 306 use a mount utility component 314 to mount images during equivalence class and manifest creation.

With the mount utility component 314, because multiple images can have the same volume attributes, the logical volume identifier (ID), physical volume ID and volume group ID of the images are changed temporarily. The renaming is necessary to avoid namespace conflicts on the system. The IDs are restored to their original values when images are unmounted.

Additionally, for example, implementation of at least one embodiment of the invention can function for UNIX based operating systems. To create the signature for an update, an example embodiment of the invention includes making use of a UNIX tool that is a diagnostic, instructional, and debugging tool, and which intercepts and records all system calls invoked by a process. The administrator applies the update on the leader within the operational context of the tool, and thus, when the update runs, all files touched by the leader or its child threads are captured. Further, at least one embodiment of the invention includes creating a conservative signature that includes all files read by the update on the leader. Files containing low-level system specific information can be filtered out from this conservative list.

The signature creator module 304 maintains a record of all file names and the operations performed thereon as part of the signature of the update. For example, the operations that are recorded by the above-noted UNIX tool can include open (read, write, modify), create, delete (rename, unlink) and permission modification operations (chmod, lstat, statfs). Once this signature is ready, at least one embodiment of the invention includes leveraging the equivalence engine 308 to apply the cross-difference operation between the leader and its clone to filter-out random and environmental parameters from these files. The PoVs and random values identified are removed from the signature files and a SHA1 digest of each file is created (wherein SHA1 is a digest (or hash) computing algorithm). This digest is used as the file signature to create one or more equivalence classes.

The manifest creator module 306 mounts the leader containing the update and the snapshot of its state before the update to determine the changes created in the file system by the update. The manifest creator module 306 seeks to identify changes only within files captured as part of the signature, as identified by the signature creator module 304. The manifest for the update contains all files that were modified and/or created by the update, their meta information (such as path, permissions, and ownership), as well as instructions regarding the nature of operations performed on each file. This information describing the contents of the manifest is stored in a meta manifest file.

The instructions are different for different types of operations performed by the update. For a file create operation, the manifest creator module 306 makes a copy of the file (data) after removing PoVs, and adds the location of the copied file in the meta manifest file, along with instructions to copy and replace PoV values when applying the manifest on another image. For files which are modified, the manifest creator module 306 can use, for example, the Linux diff utility to create the patch. The manifest creator module 306 adds the location of the patch along with instructions to apply the patch in the meta manifest file. Similarly, for files for which permissions are modified, the manifest contains the new permission as data, and instructions to change permission of the file to the new value. Files that were only read are excluded from the manifest, and for files that are marked for deletion, a delete instruction is added in the manifest.

Given an update signature for a leader, the equivalence engine 308 creates signatures for all other images in the data center. The process to create signatures for other images is the same as the signature creation process in the signature creator module 304. The files corresponding to the signature are fetched from the instances, and the random values and PoVs are filtered out. A SHA1 hash is computed for each file and is used for creating equivalence classes. Additionally, the above process is parallelizable and can be performed for all images in parallel. Once the signature is created for every image, the images are classified into equivalence classes. Further, in at least one embodiment of the invention, this operation scales for data centers with very large number of images.

At least one embodiment of the invention also includes maintaining SHA1 hashes for each file in the signature of the leader as a hash table. The domain of SHA1 hashes can be divided into equal sized compartments, where each compartment is maintained as a linked list. Each entry in the list contains a SHA1 hash and the file corresponding thereto. For an image, the SHA1 hash for each file that maps to a signature file is computed. Because SHA1 is a standard technique, its functions are available in all implementing languages. Accordingly, at least one embodiment of the invention utilizes a function that takes the entire content of the file as input and computes its SHA1 digest. If all SHA1 values are found in this hash table, the image is equivalent to the leader. If at least one file cannot be mapped to existing hashes in the hash table, the image is not equivalent. Accordingly, the total number of operations needed for this classification is $O(n|S|)$, where n is the number of images and IS) is the number of files in the signature.

Figure 4:
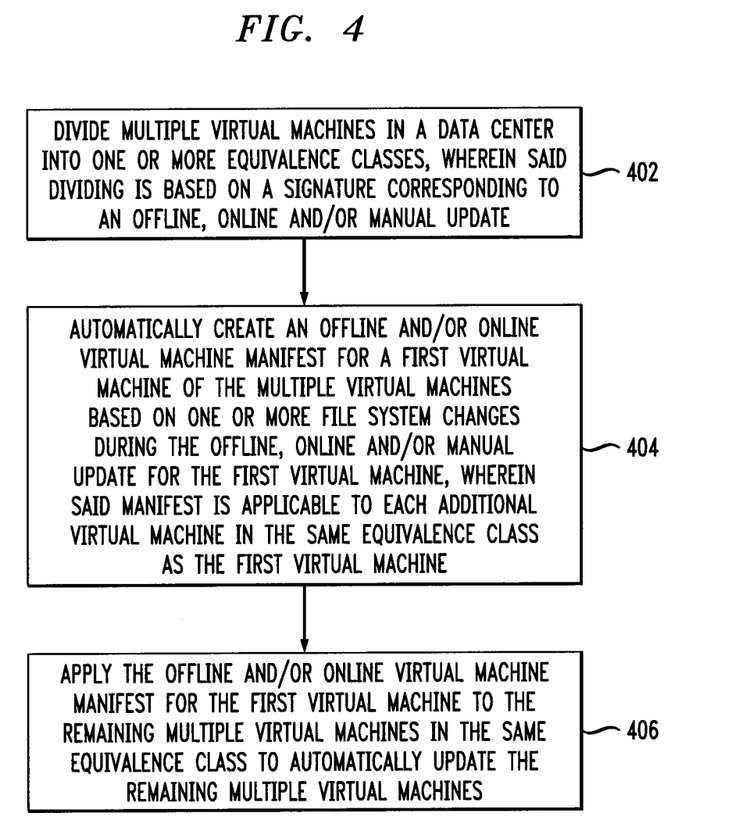
FIG. 4 is a flow diagram illustrating techniques for automatically propagating updates in a data center, according to an embodiment of the invention.

FIG. 4 is a flow diagram illustrating techniques for automatically propagating updates in a data center, according to an embodiment of the present invention. Step 402 includes dividing multiple virtual machines in a data center into one or more equivalence classes, wherein each equivalence class is based on a signature corresponding to an offline, online and/ or manual update. As detailed herein, a signature can include all files having a dependency on the corresponding offline, online and/or manual update.

Dividing can include identifying virtual machines with semantically identical content. Additionally, dividing can include creating a signature for each offline, online and/or manual update and partitioning the multiple virtual machines in the data center into the one or more equivalence classes based on the signature. As described herein, a pair of virtual machines is considered as being in the same equivalence class if the result of any update applied on the pair of virtual machines is identical.

Step 404 includes automatically creating an offline and/or online virtual machine manifest for a first virtual machine of the multiple virtual machines based on one or more file system changes during the offline, online and/or manual update for the first virtual machine, wherein said manifest is applicable to each additional virtual machine in the same equivalence class as the first virtual machine. In at least one embodiment of the invention, the offline and/or online virtual machine manifest is not dependent upon action performed by the offline, online and/or manual update or upon human remediation action performed in connection with the offline, online and/or manual update. Also, in at least one embodiment of the invention, automatically creating an offline and/or online virtual machine manifest includes utilizing only one online instance for each equivalence class.

Step 406 includes applying the offline and/or online virtual machine manifest for the first virtual machine to the remaining multiple virtual machines in the same equivalence class to automatically update the remaining multiple virtual machines in the same equivalence class. The applying step can include applying the offline and/or online virtual machine manifest for the first virtual machine to the remaining multiple virtual machines in the same equivalence class in parallel.

The techniques depicted in FIG. 4 can additionally include taking a snapshot of the first virtual machine before the offline, online and/or manual update is applied to the first virtual machine, as well as performing an image diff between the snapshot and the updated virtual machine once the offline, online and/or manual update completes successfully. Further, at least one embodiment of the invention includes creating a patch for every noted difference between a snapshot and an updated virtual machine, wherein the patch transforms the virtual machine in the snapshot to the updated virtual machine. As also detailed herein, a collection of one or more patches constitutes a manifest for a corresponding offline, online and/or manual update, wherein the manifest can subsequently be used to update the remaining virtual machines in the relevant equivalence class offline.

Additionally, the techniques depicted in FIG. 4 can also include filtering-out system-specific information while and/ or prior to dividing the multiple virtual machines in the data center into the one or more equivalence classes. Further, at least one embodiment of the invention includes converting an update on a live virtual machine into a patch for a dormant virtual machine.

Figure 5:
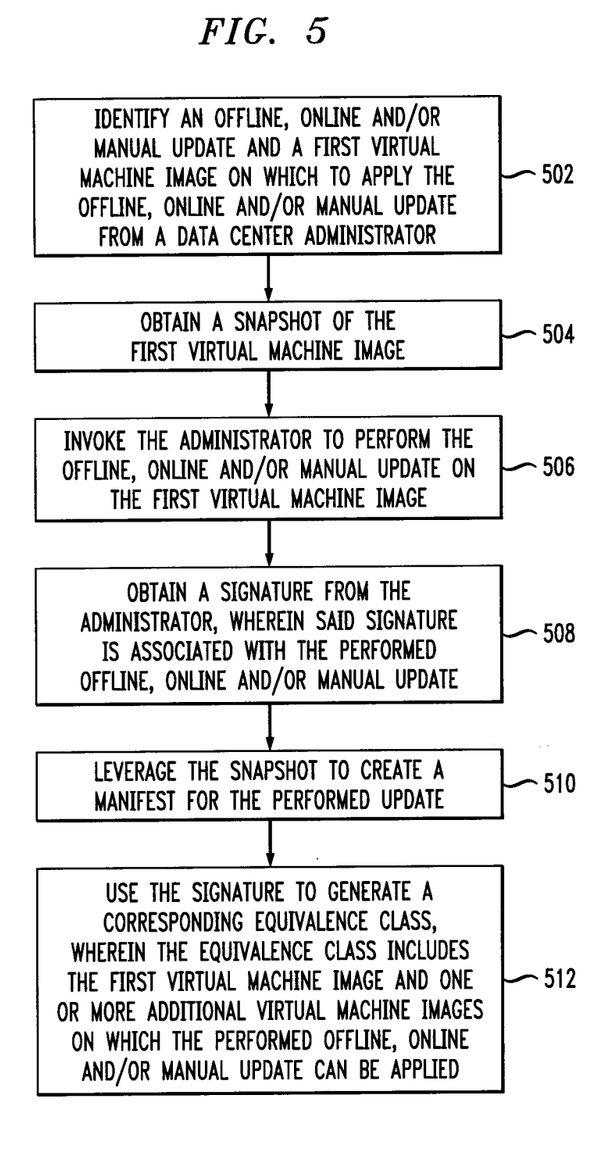
FIG. 5 is a flow diagram illustrating techniques for automatically propagating updates in a data center, according to an embodiment of the invention.

FIG. 5 is a flow diagram illustrating techniques for automatically propagating updates in a data center, according to an embodiment of the invention. Step 502 includes identifying an offline, online and/or manual update and a first virtual machine image on which to apply the offline, online and/or manual update from a data center administrator. Step 504 includes obtaining a snapshot of the first virtual machine image. Step 506 includes invoking the data center administrator to perform the offline, online and/or manual update on the first virtual machine image.

Step 508 includes obtaining a signature from the data center administrator, wherein said signature is associated with the performed offline, online and/or manual update. Step 510 includes leveraging the snapshot of the first virtual machine image to create a manifest for the performed update. Additionally, step 512 includes using the signature to generate a corresponding equivalence class, wherein the equivalence class includes the first virtual machine image and one or more additional virtual machine images on which the performed offline, online and/or manual update can be applied.

The techniques depicted in FIG. 4 and FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 and FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 6:
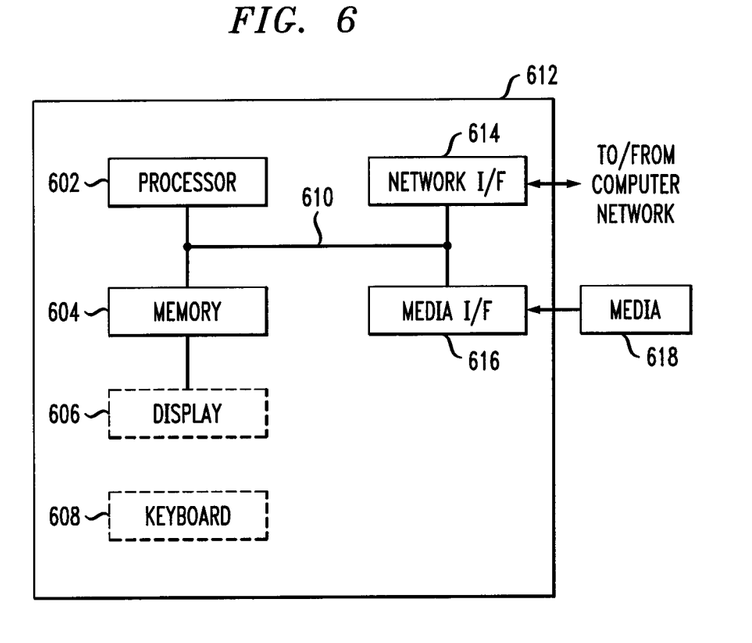
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, automatically propagating updates in a data center.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising steps of: dividing multiple distinct virtual machines in a data center into two or more equivalence classes based on a signature corresponding to an update that can be applied to a virtual machine in an offline, online and/or manual mode, wherein the signature comprises a representation of all files of a virtual machine that are impacted by the update that can be applied to a virtual machine in an offline, online and/or manual mode, and wherein each of the two or more equivalence classes comprises a set of two or more of the multiple distinct virtual machines that have identical content in the signature corresponding to the update that can be applied to a virtual machine in an offline, online and/or manual mode;

automatically creating a virtual machine manifest for a first virtual machine of the multiple virtual machines based on one or more file system changes during the update that can be applied to a virtual machine in an offline, online and/or manual mode for the first virtual machine, wherein said manifest is applicable to each additional virtual machine in the same equivalence class as the first virtual machine, and wherein said automatically creating the manifest comprises:

taking a snapshot of the first virtual machine before the update that can be applied to a virtual machine in an offline, online and/or manual mode is applied to the first virtual machine;

performing an image diff between the snapshot and the updated first virtual machine after the update that can be applied to a virtual machine in an offline, online and/or manual mode is applied to the first virtual machine; and     creating a first patch for each of one or more noted differences between the snapshot and the updated first virtual machine, wherein the patch transforms the first virtual machine in the snapshot to the updated first virtual machine;

converting the update on a live virtual machine into a second patch for each dormant virtual machine in the same equivalence class via implementation of a background logging mechanism; and     bundling the first and second patches into a collection, wherein the collection of patches represents the virtual machine manifest; and     applying the virtual machine manifest for the first virtual machine to the remaining multiple virtual machines in the same equivalence class to automatically update the remaining multiple virtual machines in the same equivalence class; wherein the steps are carried out by at least one computer device.

2. The method of claim 1, comprising: creating a signature for each update that can be applied to a virtual machine in an offline, online and/or manual mode.

3. The method of claim 1, wherein a pair of virtual machines. is considered as being in the same equivalence class if the result of any update applied on the pair of virtual machines is identical.

4. The method of claim 1, wherein said automatically creating comprises utilizing only one online virtual machine instance for each equivalence class.

5. The method of claim 1. wherein said applying comprises applying the virtual machine manifest for the first virtual machine to the remaining multiple virtual machines in the same equivalence class in parallel.

6. The method of claim 1. comprising: filtering-out system-specific information while and/or prior to dividing the multiple virtual machines in the data center into the two or more equivalence classes.

7. An article of manufacture comprising a non-transitory computer readable storage medium having computer readable instructions tangibly embodied thereon which, when implemented, cause a computer to carry out a plurality of method steps comprising:

dividing multiple distinct virtual machines in a data center into two or more equivalence classes based on a signature corresponding to an update that can be applied to a virtual machine in an offline, online and/or manual mode, wherein the signature comprises a representation of all files of a virtual machine that are impacted by the update that can be applied to a virtual machine in an offline, online and/or manual mode, and wherein each of the two or more equivalence classes comprises a set of two or more of the multiple distinct virtual machines that have identical content in the signature corresponding to the update that can be applied to a virtual machine in an offline, online and/or manual mode;

automatically creating a virtual machine manifest for a first virtual machine of the multiple virtual machines based on one or more file- system changes during the update that can be applied to a virtual machine in an offline, online and/or manual mode for the first virtual machine, wherein said manifest is applicable to each additional virtual machine in the same equivalence- class as the first virtual machine, and wherein said automatically creating the manifest comprises:

taking a snapshot of the first virtual machine before the update that can be applied to a virtual machine in an offline, online and/or manual mode is applied to the first virtual machine;

performing an image diff between the snapshot and the updated first virtual machine after the update that can be applied to a virtual machine in an offline, online and/or manual mode is applied to the first virtual machine; and     creating a first patch for each of one or more noted differences between the snapshot and the updated first virtual machine, wherein the patch transforms the first virtual machine in the snapshot to the updated first virtual machine;

converting the update on a live virtual machine into a second patch for each dormant virtual machine in the same equivalence class via implementation of a background logging mechanism; and     bundling the first and second patches into a collection, wherein the collection of patches represents the virtual machine manifest; and     applying the virtual machine manifest for the first virtual machine to the remaining multiple virtual machines in the same equivalence class to automatically update the remaining multiple virtual machines in the same equivalence class.

8. The article of manufacture of claim 7, wherein said automatically creating comprises utilizing only one online virtual machine instance for each equivalence class.

9. The article of manufacture of claim 7, wherein the method steps comprise: filtering-out system-specific information while and/or prior to dividing the multiple virtual machines in the data center into the two or more equivalence classes.

10. A system comprising:

a memory; and at least one processor coupled to the memory and operative for;

dividing multiple distinct virtual machines in a data center into two or more equivalence classes based on a signature corresponding to an update that can be applied to a virtual machine in an offline, online and/or manual mode, wherein the signature comprises a representation of ail files of a virtual machine that are impacted by the update that can be applied to a virtual machine in an offline, online and/or manual mode, and wherein each of the two or more equivalence classes comprises a set of two or more of the multiple distinct virtual machines that have identical content in the signature corresponding to the update that can be applied to a virtual machine in an offline, online and/or manual mode;

automatically creating a virtual machine manifest for a first virtual machine of the multiple virtual machines based on one or more file system changes during the update that can be applied to a virtual machine in an offline, online and/or manual mode for the first virtual machine, wherein said manifest is applicable to each additional virtual machine in the same equivalence class as the first virtual machine, and wherein said automatically creating the manifest comprises:

taking a snapshot of the first virtual machine before the update that can be applied to a virtual machine in an offline, online and/or manual mode is applied to the first virtual machine;

performing an image diff between the snapshot and the updated first virtual machine after the update that can be applied to a virtual machine in an offline, online and/or manual mode is applied to the first virtual machine; and creating a first patch for each of one or more noted differences between the snapshot and the updated first virtual machine, wherein the patch transforms the first virtual machine in the snapshot to the updated first virtual machine;

converting the update on a live virtual machine into a second patch for each dormant virtual machine in the same equivalence class via implementation of a background lodging mechanism; and bundling the first and second patches into a collection, wherein the collection of patches represents the virtual machine manifest; and applying the virtual machine manifest for the first virtual machine to the remaining multiple virtual machines in the same equivalence class to automatically update the remaining multiple virtual machines in the same equivalence class.

11. A method comprising steps of:

identifying an update that can be applied to a virtual machine in an offline, online and/or manual mode and a first virtual machine image on which to apply the update from a data center administrator;

obtaining a snapshot of the first virtual machine image before the update is applied to the first virtual machine image;

invoking the data center administrator to perform the update on the first virtual machine image;

obtaining a signature from the data center administrator, wherein said signature comprises a representation of all files of the first virtual machine that are impacted by the update;

leveraging the snapshot of the first virtual machine image to create a manifest for the performed update, and wherein said automatically creating the manifest comprises:

performing an image diff between the snapshot and the updated first virtual machine image after the update is performed on the first virtual machine image; and creating a first patch for each of one or more noted differences between the snapshot and the updated first virtual machine image. wherein the patch transforms the first virtual machine image in the snapshot to the updated first virtual machine image;

converting the update on a live virtual machine into a second patch for each dormant virtual machine in the same equivalence class as the first virtual machine via implementation of a background logging mechanism, wherein the equivalence class includes the first virtual machine image and one or more additional virtual machine images that have identical content in the signature corresponding to the update: and bundling the first and second patches into a collection, wherein the collection of patches represents the manifest for the update, wherein the manifest for the performed update is applicable to each of the one or more additional virtual machine images in the same equivalence class as the first virtual machine image; wherein the steps are carried out by at least one computer device.

* * * * *